(No Model.) 3 Sheets—Sheet 3.

A. N. ROOKS.
COMBINED AIR VALVE KITCHEN AND GROCERY CABINET.

No. 507,933. Patented Oct. 31, 1893.

Witnesses:
John Enders Jr
L. L. Tracey.

Inventor
Alva N. Rooks
by
Higdon & Higdon & Longan
Attys

UNITED STATES PATENT OFFICE.

ALVA N. ROOKS, OF IUKA, ILLINOIS, ASSIGNOR OF ONE-HALF TO WILLIAM J. TWEED, OF SAME PLACE.

COMBINED AIR-VALVE KITCHEN AND GROCERY CABINET.

SPECIFICATION forming part of Letters Patent No. 507,933, dated October 31, 1893.

Application filed May 18, 1893. Serial No. 474,662. (No model.)

*To all whom it may concern:*

Be it known that I, ALVA N. ROOKS, of the town of Iuka, Marion county, and State of Illinois, have invented certain new and useful Improvements in a Combined Air-Valve Kitchen and Grocery Cabinet, of which the following is a full, clear, and exact description, reference being had to the accompanying drawings, forming a part hereof.

My invention relates to a kitchen cabinet and consists in the novel construction, combination and arrangement of parts hereinafter specified and designated in the claims.

The object of my invention is to provide an improved device of this class which shall possess many conveniences for the operator in the kitchen and which shall be constructed with an improved means for thoroughly ventilating the flour, Graham flour and corn-meal and similar articles stored in the cabinet during operation.

Figure 1:
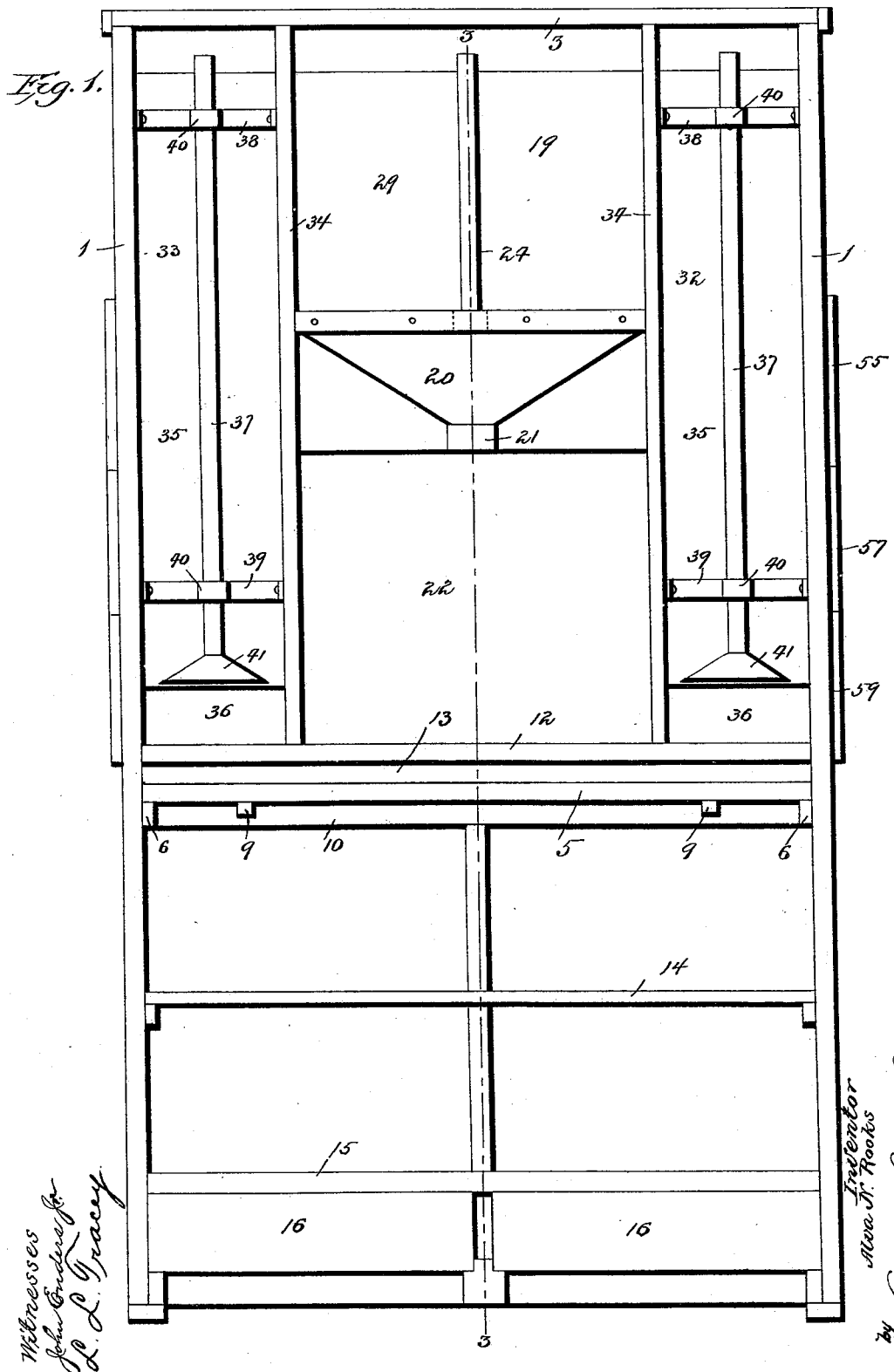
Figure 2:
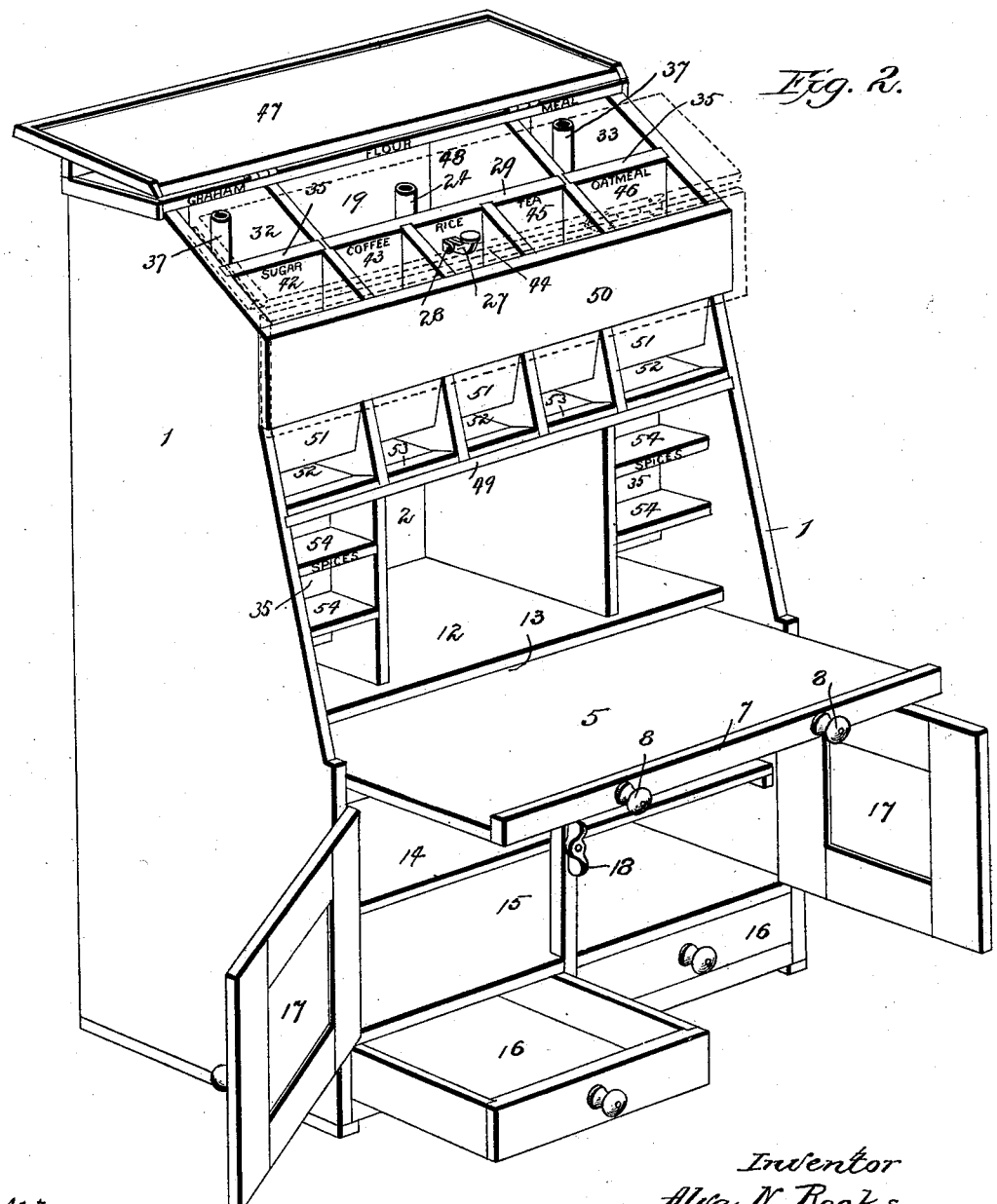
Figure 3:
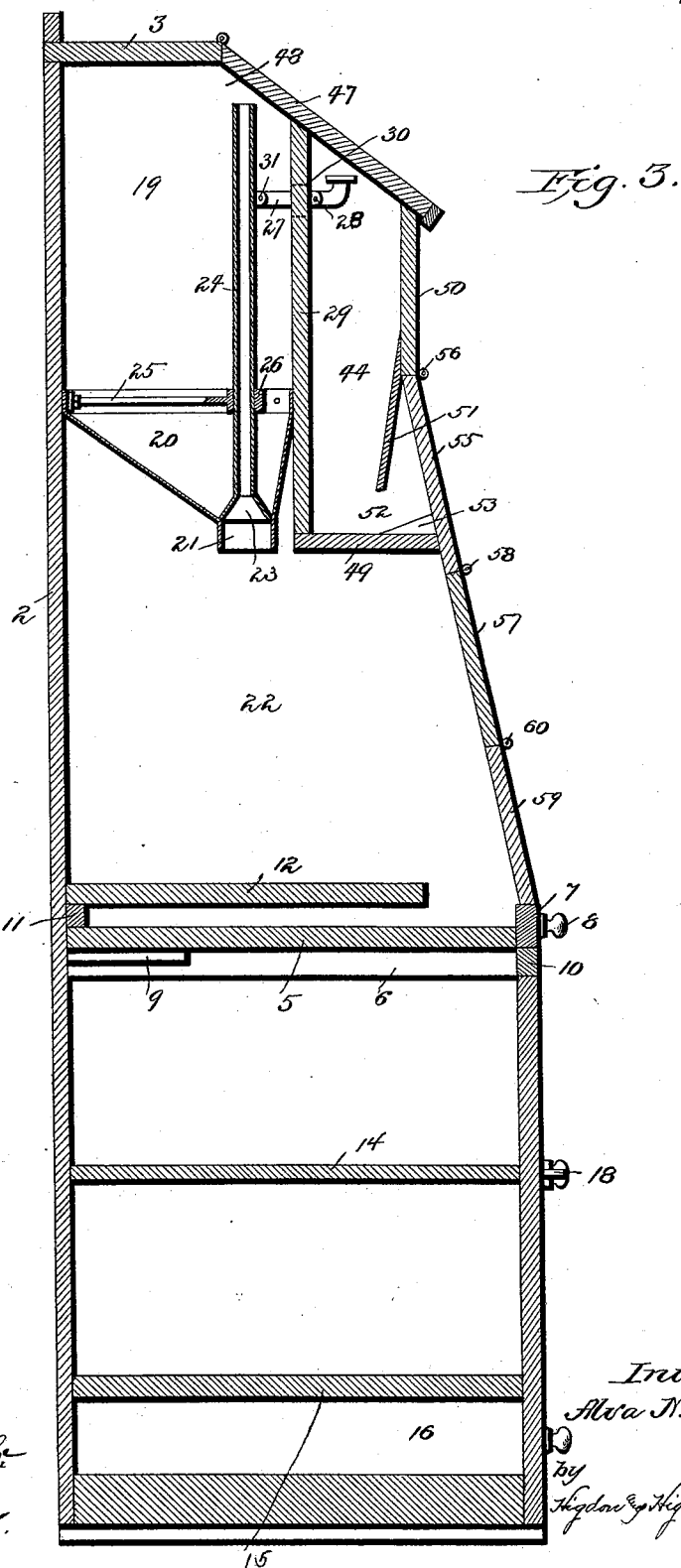

In the drawings: Figure 1 is a rear elevation of my improved cabinet, having the rear wall removed, to disclose the devices in front of said wall. Fig. 2 is a perspective view of the same. Fig. 3 is a sectional elevation of same taken on the line 3—3 of Fig. 1.

The body of the cabinet is comparatively tall, five and one half feet, so as to rest upon the floor or other support and extend upward a sufficient distance to bring the kneading board and the compartments for tea, spices, &c., within convenient reach of the operator standing upon the floor adjacent the cabinet. The body is composed of opposite end pieces 1, a rear wall 2, a fixed top 3, a closed bottom, and a front made up of the devices hereinafter mentioned. The space between the end pieces 1 is divided into three separate divisions, there being a lower division separated from the intermediate division by means of a kneading board 5, an intermediate division above said kneading board, and an upper division in which is located the devices hereinafter mentioned.

The kneading board is loosely mounted to slide out and in upon horizontal bars 6, with its ends loosely in contact with the inner surface of the end pieces 1, so that it may be drawn out to the position shown in Fig. 2 during use and pushed inward to the position in which it is shown in Fig. 3 when not in use, in which last named position its inner edge rests in contact with the rear wall 2 of the cabinet.

The kneading board 5 is provided with a front strip 7 upon its forward edge which projects upward a distance above the upper surface of the board and serves to retain the dough and other materials upon the board and prevent same from passing over said edge and falling upon the floor when the board is in use. The front side of this strip 7 is provided with knobs or handles 8, by means of which the board may be operated.

Mounted upon the under surface of the kneading board 5 at a point adjacent its inner edge are two or more strips of material 9, the outer ends of which come in contact with a strip 10 fixed below the point occupied by the front strip 7 of the kneading board when in normal position, and these strips 9 thereby act as stops to limit the outward movement of said kneading board and preventing same from being accidentally withdrawn from the cabinet. But when it is desired to detach the kneading board from the cabinet, such action may be accomplished by elevating the outer edge of the board to such a position above its inner edge as will elevate the outer ends of the strips 9 above the strip 10, and then the kneading board and the strips 9 may be pulled outward and detached, said strips 9 passing above the fixed strip 10 of the cabinet in such operation.

Mounted upon the upper service of the kneading board flush with its inner edge is a strip 11 which extends parallel to said edge, and bears upon the under service of a fixed horizontal board 12 which is located directly above the kneading board and has its ends connected to the end pieces 1 of the cabinet, so that a space 11 is formed between the upper surface of the kneading board and the under surface of the fixed board 12. When the kneading board is pulled out ready for use the strip 11 comes flush with the forward edge of the fixed board 11, and closes the outer opening 13 against entrance of dough or other material which may be upon the kneading board.

Located in the lower division of the cabinet are horizontal shelves 14 and 15 upon which various articles may be placed by the operator during use, and beneath the lower shelf 15 are located separate drawers 16, which may be pulled out and be used for various purposes according to the desires of the operator. Access to the shelves 14 and 15 is had by way of doors 17, which are secured to the front of the cabinet and provided with a suitable fastening device, such as a button 18 or the like, of any construction.

Formed in the upper compartment of the cabinet is a flour bin 19 of sufficient capacity to hold the desired weight of flour. A portion of the upper end of the flour bin is normally closed by the fixed top 3. The flour bin is provided with a hopper-bottom 20, the sides of which converge and connect with the spout 21 which opens directly above the fixed board 12 so as to discharge flour directly upon the fixed board in the space 22 beneath said spout. The discharge of flour from the flour bin through the spout 21 is controlled by what I call an air-valve 23. This valve is preferably in the form here shown, that is, it is in the form of a hollow truncated cone, having a circular lower edge, which is normally in contact with the upper end of the spout 21 and closes the opening to said spout.

24 is a straight vertical tube, one end of which is connected to the upper edge of the valve 23 so that the interior of the tube connects with the interior of the valve. This tube extends upward in the flour bin to a point adjacent the upper end of said bin and has its upper end free and open.

25 indicates a bracket having its inner end attached to the rear side of the flour bin and its outer end free and provided with an eye 26. This bracket 28 is located adjacent the lower end of said tube 24, and said tube loosely engages said eye and the lower end of the tube and said valve carried thereby are guided by this bracket in their vertical movements during operation.

The tube 24 performs a double function. It acts as a ventilating passage through which air circulates and also acts as a support for moving the valve.

27 indicates a lever fulcrumed at 28 intermediate its length to the front wall 29 of the flour bin, and operating loosely in a slot 30 in said front wall. The outer end of this lever projects in front of said front wall, so as to be accessible and its inner end projects inward and is pivotally connected to the tube 24 at a point 31 adjacent the upper end of said tube.

Located in the upper division of the cabinet upon one side of the flour bin 19 is a bin 32 for Graham flour, and located upon the opposite side of said flour bin 19 is a bin 33 similar in construction to the bin 32 and adapted to contain corn meal. The bins 32 and 33 are separated from the flour bin by vertical partitions 34 which extend vertically from the top 3 downward and have their lower ends secured to the fixed board 12, so that flour or meal therein gravitates downward and rests upon said fixed board. The said fixed board forms the bottom for said bins 32 and 33. The front walls 35 of the bins 32 and 33 do not extend to the fixed board 12, however, but terminate a distance above the same, thereby forming an opening 36 in the front of each of said bins which is always open, so that the material in said bins gravitates and automatically spreads outward through said openings upon the fixed board 12, as a part is withdrawn for use.

Located in each of the bins 32 and 33 is a straight vertical tube 37 which extends centrally and longitudinally therein. These tubes are supported by suitable spiders or brackets 38 and 39, the brackets 38 being located adjacent the upper ends of said tubes while the brackets 39 are located adjacent the lower ends thereof, so that both ends of said tubes are supported apart from the walls of said bins. The brackets 38 and 39 consist of thin strips of iron the thickness of which is shown, and they are each provided with an eye 40 through which the tubes pass. These brackets being composed of thin strips of metal do not interfere with the downward passage of material in said bins. The lower ends of the tubes 37 terminate a distance above the fixed board and are thereat provided with inverted funnels or flaring mouths 41. The flaring mouths 41 are preferably of such diameter as to extend adjacent the walls of the said bins 32 and 33, for a purpose hereinafter mentioned. The upper ends of the tubes 37 are open.

A series of small bins or compartments 42, 43, 44, 45, 46, &c., have their upper ends open and are located in front of the flour bin 19 and the bins 32 and 33, and a hinged leaf or cover 47 has its rear edge hinged to the forward edge of the top 3 so as to cover the upper ends of said series of small bins and cover the opening 48 leading to the flour bin 19. The bottom of the series of bins 42, 43, &c., is formed by a horizontal board 49. The front wall 50 of the bins 42, 43, &c., terminates a distance above the board 49 and located in each bin is an inclined board 51, the lower edge of which terminates a distance above the board 49 so as to form a space 52 between it and the said board 49, and the upper edge of which is connected to the front wall 50 of said bin. A scooping strip 53 having its upper surface inclined downward and inward is located closely adjacent the opening 52 leading into each of the series of small bins, for a purpose hereinafter mentioned.

Located in front of each of the bins 32 and 33 are a series of small shelves 54, upon which are adapted to be placed small cans or canisters having the ordinary screw tops or otherwise constructed, for containing spices and the like and holding them conveniently adjacent the kneading board.

The front of the intermediate division of the cabinet is closed by a cover composed of a series of parallel sections hinged together. The upper edge of the upper section 55 is hinged to the lower edge of the front 50 by means of hinges 56, while the upper edge of the next lower section 57 is hinged to the lower edge of the section 53 by means of hinges 58, and the upper edge of the lower section 59 is hinged to the lower edge of the section 57 by means of hinges 60.

The operation is as follows: When access is desired to the bins, the hinged leaf or cover 47 is elevated and thrown back to the position shown in Fig. 2, when flour, meal or other articles may be placed within said bin. The tubes 24 and 37 being straight and freely open throughout their length and being located vertical, act as flues or ventilating tubes, drawing in air at their lower ends and discharging it at their upper ends into the space above the material stored in the said bins, especially when the leaf or cover 47 is in an open position. The air above the material stored in the bins is thereby kept pure at all times, and retains the material in good condition, producing a distinct circulation of air, which tends to retain the natural flavor and sweetness of said materials. When it is desired to withdraw a supply of flour from the flour bin 19, the outer end of the lever 27 is depressed, thereby elevating its inner end and the tube 24, as well as the valve 23 and elevating the valve a distance above the upper end of the spout 21 and thereby permitting the flour to gravitate downward beneath the lower edge of said valve into the spout 21 and fall upon the fixed board 12, whence it may be removed at pleasure. The material in the bins 32 and 33 gravitates downward as it is removed from the opening 36, and comes in contact with the inclined outer surface of the hollow cones or flaring mouths 41, and is thereby separated into thin streams which gravitate past the marginal edges of said flaring mouths, and the material is thereby brought into more intimate contact with the air than it would be if said mouths were not located as they are.

I am aware that a kitchen cabinet has been provided with a centrally located flour chest, and arranged with a chest or bin each side of said centrally located chest, and I therefore do not claim such broadly.

I am further aware that a flour chest has been provided with a ventilating tube, which opens from the bottom of said chest, and extends vertically therein near to the top of the same, and then is turned or bent horizontally, but as such tube has not been straight and vertical, and is not adapted to my purpose, I hereby disclaim such.

I am further aware that various patents have been granted for funnels, provided with a valve for closing the stem thereof, and I therefore do not claim a funnel as my invention.

The inclined scooping strip 53 located closely adjacent the opening 52 leading into each of the series of small bins, 42, 43, &c., acts not only as a scooping-strip, but acts to prevent the material in said bins from gravitating so far outward through said opening as to be wasted, said scooping strip substantially elevating the bottoms of said bins at a point adjacent said opening.

What I claim is—

1. The improved kitchen cabinet, having a kneading board, and various receptacles for holding spices, &c., a flour-bin 19 formed in said cabinet, and provided with a hopper-bottom 20, the sides of which converge and connect with a vertical spout 21, the air valve 23 in the form of a hollow truncated cone, having a circular lower edge normally held in contact with the upper end of said spout, and closing the opening thereof, a straight vertical tube 24, mounted in said flour chest with its lower end connected to the upper edge of said valve 23, so that the interior of said tube connects with the interior of said valve, said tube extending upward in said bin to a point adjacent the upper end thereof, and having its upper end free and open, a bracket 25, having its inner end attached to the side of said flour bin, and its outer end free, and provided with an eye 26, said bracket being adjacent to the lower end of said tube 24, with said tube loosely engaging said eye, said tube being arranged as a ventilating passage through which air circulates, and also as a support or handle by means of which the valve is moved, a lever 27 fulcrumed intermediate of its length to the front wall 29 of said flour bin, and operating loosely in the slot 30 in said front wall, the outer end of this lever being free and projecting in front of said front wall so as to be accessible, and its inner end projecting inward, and pivotally connected to said tube 24 at a point 31, adjacent the upper end of said tube, and a cover which is located above the upper end of said flour chest, and above said lever, substantially as herein specified.

2. The improved kitchen cabinet, constructed with a centrally-located flour bin 19, provided with a hopper-bottom 20, and vertical spout 21, secured to said bottom, an air-valve 23 in the form of a truncated-cone, having a circular lower edge normally in contact with the upper end of said spout, a straight vertical tube 24, the lower end of which is connected to the upper edge of said valve, said tube extending upward in said flour bin to a point adjacent the upper end of said bin, and having its upper end free and open, a bracket 25 having an eye 26 and secured upon the interior of said bin with its eye loosely engaged by said tube 24, a lever 27 fulcrumed intermediate of its length to the front wall of said flour bin, so that its outer end projects in front of said front wall accessible to the operator, and so that its inner end projects inward and is pivotally connected to said tube 24, a bin 32 located in said cabinet at one side of said flour bin, a bin 33 similar in construction to the bin 32, and located upon the side of said flour bin which is opposite that on which the said bin 32 is located, a fixed horizontal board 12 below said bins, vertical partitions 34 which extend vertically from the top of the cabinet downward with their lower ends secured to said horizontal board 12 so that flour or meal in said bins gravitates downward and rests upon said horizontal board, the front walls 35 of the bins 32 and 33 terminating a distance above said horizontal board and forming an opening 36 in the front of each of said bins always open, so that the material in said bins spreads outward through said openings upon said horizontal board, straight vertical tubes 37, located one in each of the bins 32 and 33, and extending centrally and longitudinally therein, brackets 38 and 39 located in said bins, and arranged to support said tubes, the lower ends of said tubes 37 terminating a distance above said horizontal board 12, flaring mouths 41 located one upon the lower end of each tube 37, and having such a diameter as to extend closely adjacent the vertical walls of said bins 32 and 33, to act as spreaders for the gravitating material held by said bins, and a cover located above said bins, substantially as herein specified.

In testimony whereof I affix my signature in presence of two witnesses.

ALVA N. ROOKS.

Witnesses:
E. E. LONGAN,
JNO. C. HIGDON.